(12) United States Patent
Geneste et al.

(10) Patent No.: US 8,997,546 B2
(45) Date of Patent: Apr. 7, 2015

(54) METHOD FOR DETECTING THE FAILURE OF A FREQUENCY SENSOR, AND CIRCUIT FOR IMPLEMENTING SAID METHOD

(75) Inventors: Nicolas Geneste, Paris (FR); Gwénaël Esteve, Paris (FR)

(73) Assignee: Sagem Defense Securite, Paris (FR)

( * ) Notice: Subject to any disclaimer, the term of this patent is extended or adjusted under 35 U.S.C. 154(b) by 288 days.

(21) Appl. No.: 13/513,479

(22) PCT Filed: Nov. 25, 2010

(86) PCT No.: PCT/EP2010/007142
§ 371 (c)(1),
(2), (4) Date: Jun. 1, 2012

(87) PCT Pub. No.: WO2011/066919
PCT Pub. Date: Jun. 9, 2011

(65) Prior Publication Data
US 2012/0240667 A1    Sep. 27, 2012

(30) Foreign Application Priority Data
Dec. 2, 2009  (FR) .................................... 09 05844

(51) Int. Cl.
*G01P 21/02*    (2006.01)
(52) U.S. Cl.
CPC ..................................... *G01P 21/02* (2013.01)

(58) Field of Classification Search
CPC ......... G08C 25/00; G01P 21/02; G01P 21/00; B60T 2270/416; G01R 23/02
USPC ................. 73/1.01, 112.01; 714/89; 701/29.8
See application file for complete search history.

(56) References Cited

FOREIGN PATENT DOCUMENTS

| DE | 39 06 304 A1 | 8/1990 |
| DE | 42 10 797 A1 | 10/1993 |
| DE | 196 36 821 A1 | 3/1998 |

OTHER PUBLICATIONS

A Designer's Guide to Instrumentation Amplifiers, 2006, 3rd Edition, pp. Cover—1-9.*

* cited by examiner

*Primary Examiner* — Laura Martin
*Assistant Examiner* — Irving A Campbell
(74) *Attorney, Agent, or Firm* — Muncy, Geissler, Olds & Lowe, P.C.

(57) ABSTRACT

A method of detecting a fault of a frequency sensor having a bias resistor and associated with a rotary member. The following steps are performed while the rotary member is stationary: injecting into the bias resistor of the sensor inverted alternating signals (S1, S2) comprising at least one first alternation (A1) and at least one second alternation (A2), the first alternation being of amplitude greater than the amplitude of the second alternation; and detecting a frequency of an output signal (S") from the sensor. A measurement circuit implementing the method is also provided.

5 Claims, 4 Drawing Sheets

METHOD FOR DETECTING THE FAILURE OF A FREQUENCY SENSOR, AND CIRCUIT FOR IMPLEMENTING SAID METHOD

BACKGROUND OF THE INVENTION

1. Field of the Invention

The present invention relates to a method of detecting a fault of a frequency sensor and to a circuit implementing the method. More particularly, the circuit is for incorporating in a control device for controlling an aeroengine such as a turbojet.

2. Brief Discussion of the Related Art

Such a control device includes a computer that determines in particular the flow rate of fuel as a function of the temperature of the engine, of the speed of rotation of the high-pressure compressor, of the speed of rotation of the low-pressure compressor, of the pressures inside the engine, and of the states of various components of the engine. The speeds of rotation of the high-pressure compressor and of the low-pressure compressor are essential for controlling the engine and they are measured by frequency sensors such as phonic wheels, e.g. comprising a toothed wheel secured to the compressor shaft and surrounded by a coil.

In such an application, where a fault of the control device can have severe consequences for the operation of the aircraft, one of the main concerns is to detect faults and preferably to identify which components have failed.

At present, in the absence of such identification, the assembly comprising the sensor and the associated circuit is changed whenever a fault is detected. This gives rise to costs that are considerable.

Nevertheless, it is known to detect a lack of signal and to associate this state with a fault. The method is simple, effective, and enables open circuits and differential short circuits to be detected. However the method does not make it possible to detect short circuits to ground.

Such identification could also be implemented using complex electronic components. Unfortunately, the reliability of electronic components diminishes with increasing complexity, whereas their cost increases with increasing complexity.

SUMMARY OF THE INVENTION

An object of the invention is to provide simple means serving to detect and identify faults in a differential sensor.

To this end, the invention provides a method of detecting a fault of a frequency sensor that is associated with a rotary member, the method comprising performing the following steps while the rotary member is stationary:

injecting at least one pulse into at least one terminal of the sensor; and detecting at least one pulse in an output signal from the sensor.

This makes it possible in particularly simple manner to detect short circuits of said terminal to ground. Any output signal detected from the sensor is a signal generated by the sensor in response to injecting said at least one pulse into at least one terminal of the sensor. Such detection is made that much easier by the frequency sensor generally including a coil that presents inductance so that it responds to the pulse by returning a strong pulse in the output signal.

Preferably, the sensor has two terminals and pulse injection and detection are performed successively on each of the terminals.

Short circuits to ground are thus detected on each terminal of the frequency sensor.

In a preferred implementation, pulses are injected into two terminals of the sensor in the form of inverted alternating signals each comprising at least one first alternation and at least one second alternation, the first alternation being of amplitude greater than the amplitude of the second alternation, with detection relating to a frequency of the output signal from the sensor.

The frequency of the output signal from the sensor is affected by the kinds of fault suffered by the sensor: it takes a value that is different for each type of fault and in particular it is zero for a differential short circuit. This is the result in particular of having alternations present that are of different amplitudes: the large-amplitude alternation is taken into account under all circumstances other than a short circuit, while the low-amplitude alternation is taken into account only in the event of an open circuit.

The invention also provides a measurement circuit comprising a frequency sensor and an acquisition system including a digital computer arranged to implement that method.

Analyzing the signals from the acquisition system thus makes it possible to detect faults and to identify them by implementing the method.

BRIEF DESCRIPTION OF THE DRAWINGS

Other characteristics and advantages of the invention appear on reading the following description of particular, non-limiting embodiments of the invention.

Reference is made to the accompanying drawings, in which.

DETAILED DESCRIPTION OF THE PREFERRED EMBODIMENTS

Figure 1:
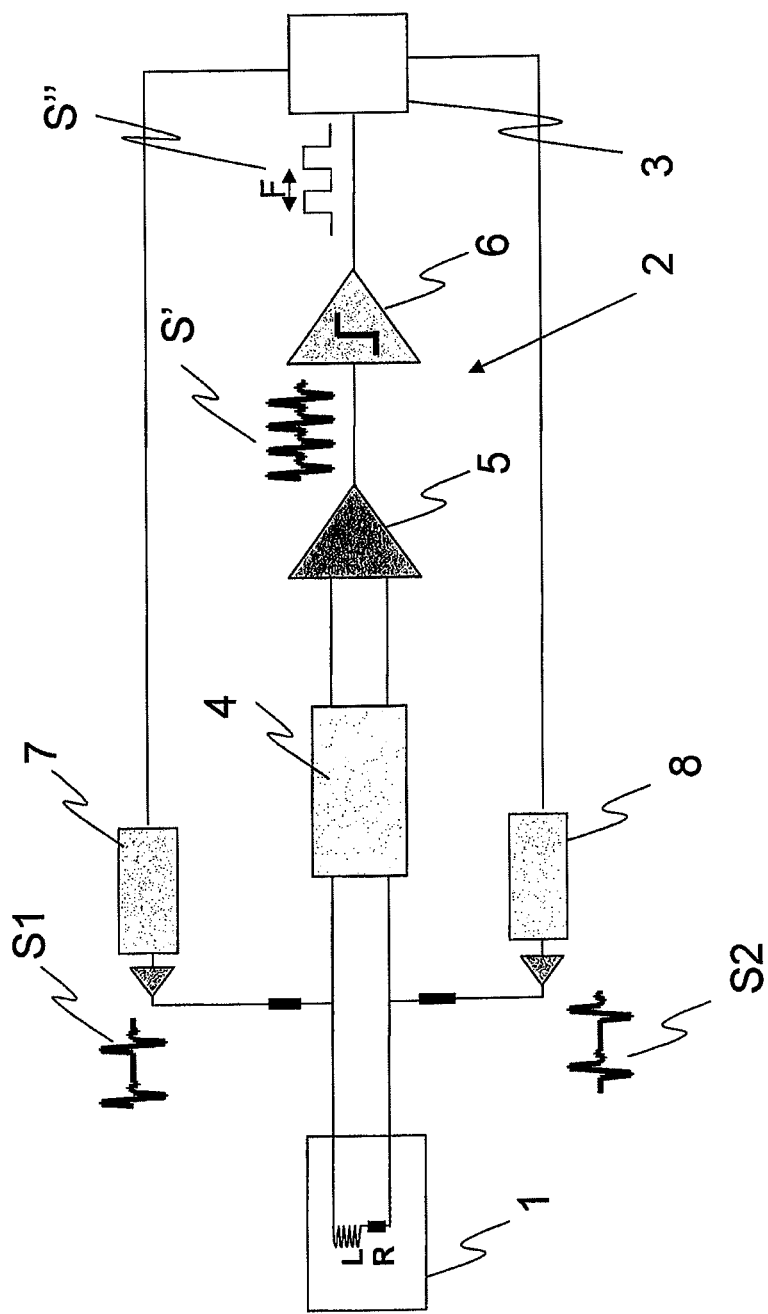
FIG. 1 is a diagram of the circuit in accordance with the invention.

The measuring circuit in accordance with the invention is described herein in association with a device for controlling an aeroengine, more particularly a turbojet, on the basis of information coming from sensors incorporated in the engine and instructions for the pilot of the aircraft. The control device actuates a member for controlling the flow rate of fuel introduced into the combustion chamber of the engine.

In this example, the measurement circuit is intended to measure a speed of rotation of the high-pressure compressor or of the low-pressure compressor of the turbojet.

With reference to the figures, the measurement circuit comprises a frequency sensor 1, here a phonic wheel of a type that is itself known, and an acquisition system, given overall reference 2, connecting the sensor 1 to a digital computer 3 (or digital core).

The acquisition system 2 comprises, going from the sensor 1 to the digital computer 3: a common-mode/differential-mode filter member 4; an amplifier 5; and a shaper member 6 for transforming a sinusoidal input signal into a transistor-transistor logic (TTL) signal.

The digital computer 3 is also connected to two terminals of the sensor 1 via respective digital-to-analog converters 7 and 8 in order to inject alternating signals into the terminals of the sensor 1.

The digital computer 3 is arranged, when the sensor and the associated rotary member are stationary, to deliver alternating signals S1, S2 to the terminals of the sensor 1 and to analyze signals output by the sensor 1, and more precisely, in this example, output by the shaper member 6.

Figure 2:
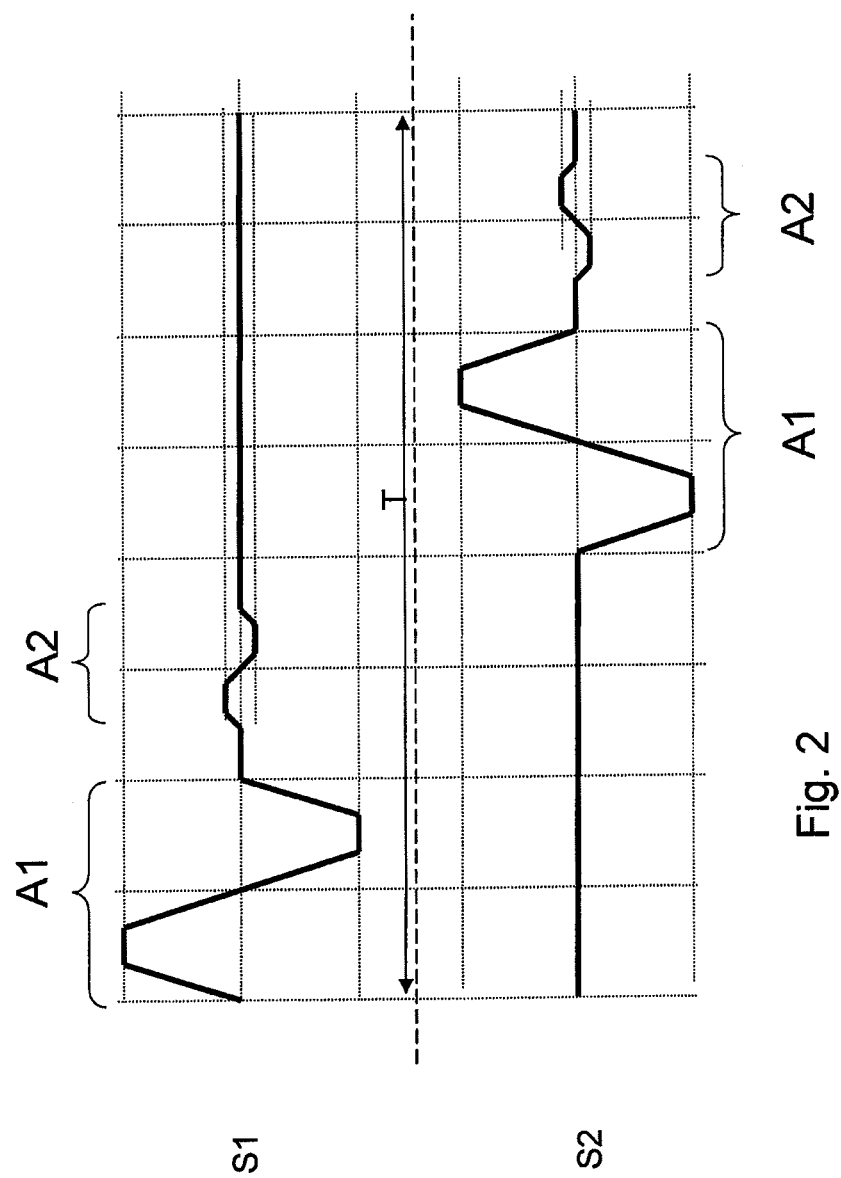
FIG. 2 is a diagram showing the waveforms of the injected signals.

With reference more particularly to FIG. 2, the injected signals S comprise at least a first alternation A1 and a second alternation A2, the first alternation A1 being of amplitude greater than that of the second alternation A2. In this example, the injected signals S are substantially sinusoidal in shape. More precisely, a signal S1 is injected to the hot point and a signal S2 is injected to the cold point, the signals S1 and S2 having the same frequency F0 but being inverted relative to each other. The alternations A1 and A2 of the signal S2 are offset in time relative to those of the signal S1.

Figure 3:
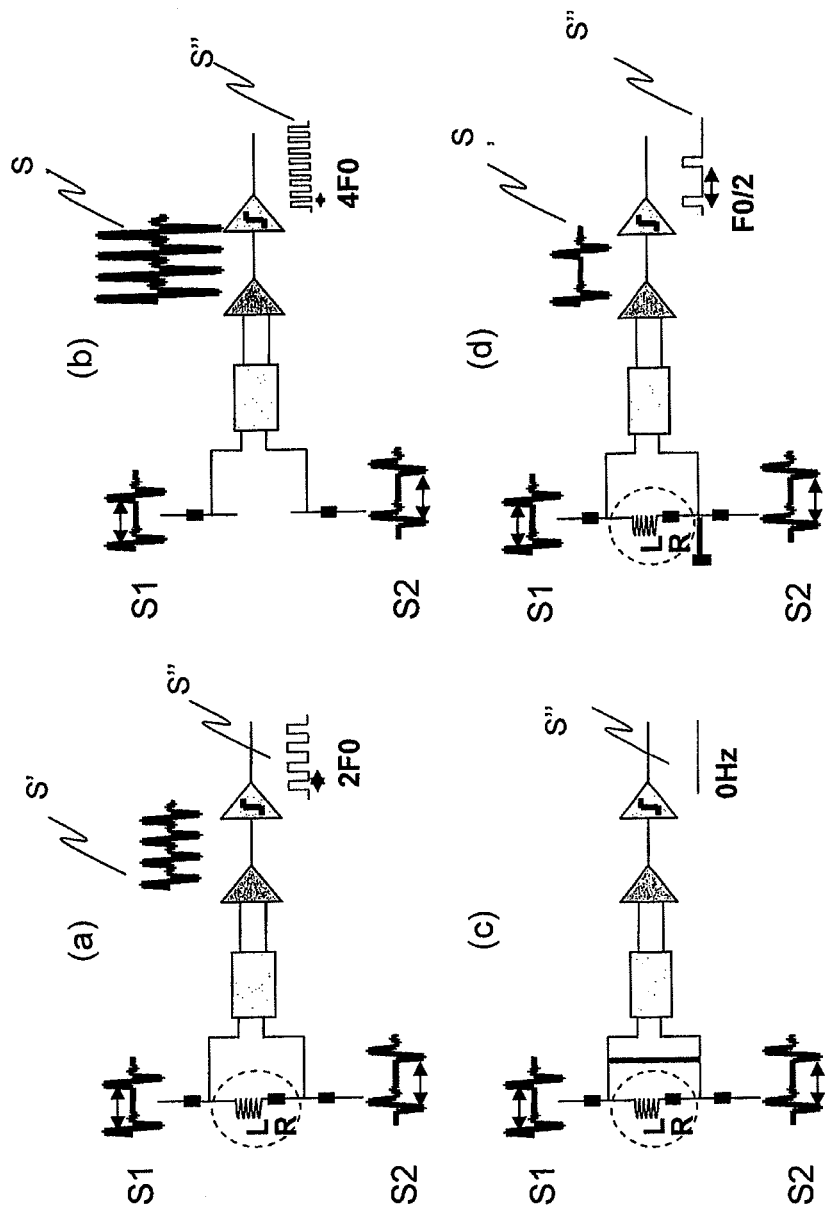
FIG. 3 is a diagram showing the various possible states of the measurement circuit, i.e. normal operation (a), a fault due to an open circuit (b), a fault due to a differential short circuit (c), and a fault due to a short circuit to ground (d)

In normal operation (FIG. 3a), the signals S1 and S2 are additive, the alternations A1 of the signals S1 and S2 following each other in the signal S' output by the amplifier, while the alternations A2 are not taken into account, such that the signal S' presents a sinusoidal waveform at a frequency that is double the frequency of each signal S, and the signal S" output by the shaper member presents a square waveform at a frequency that is identical to the frequency of the signal S'. The alternations A2 are not taken into account because they are attenuated by the divider bridge created by the impedance of the sensor and the impedances of bias resistors.

In the event of an open circuit (FIG. 3b), the alternations A2 are taken into account since they are not attenuated by the sensor, unlike the above situation. The signals S1 and S2 are additive, the alternations A1 and A2 of the signals S1 and S2 following one another in the signal S' giving rise to the alternations A1 and A2 being taken into account by the shaper member 6, such that the signal S" has a frequency equal to four times the frequency of the signals S and S'.

In the event of a differential short circuit (FIG. 3c), the two terminals are connected together and no signal enters those terminals. The signals S' and S" are thus at zero frequency.

In the event of a short circuit to ground (FIG. 3d), only one of the signals S reaches the amplifier 4, such that the signals S' and S" are at a frequency equal to the frequency of the signals S.

The circuit is thus arranged to detect and identify faults.

Naturally, the invention is not limited to the embodiment described but covers any variant coming within the ambit of the invention as defined by the claims.

In particular, the circuit in accordance with the invention may be used with one or more sensors.

Although the invention is described above in an aviation application, the invention is applicable to measurement by means of frequency sensors of any type for the purposes of engine control or for any other type of control, such as for example an anti-skid system of a brake device.

The digital computer may be a dedicated digital computer, or it may be a digital computer that also performs one or more other functions.

Figure 4:
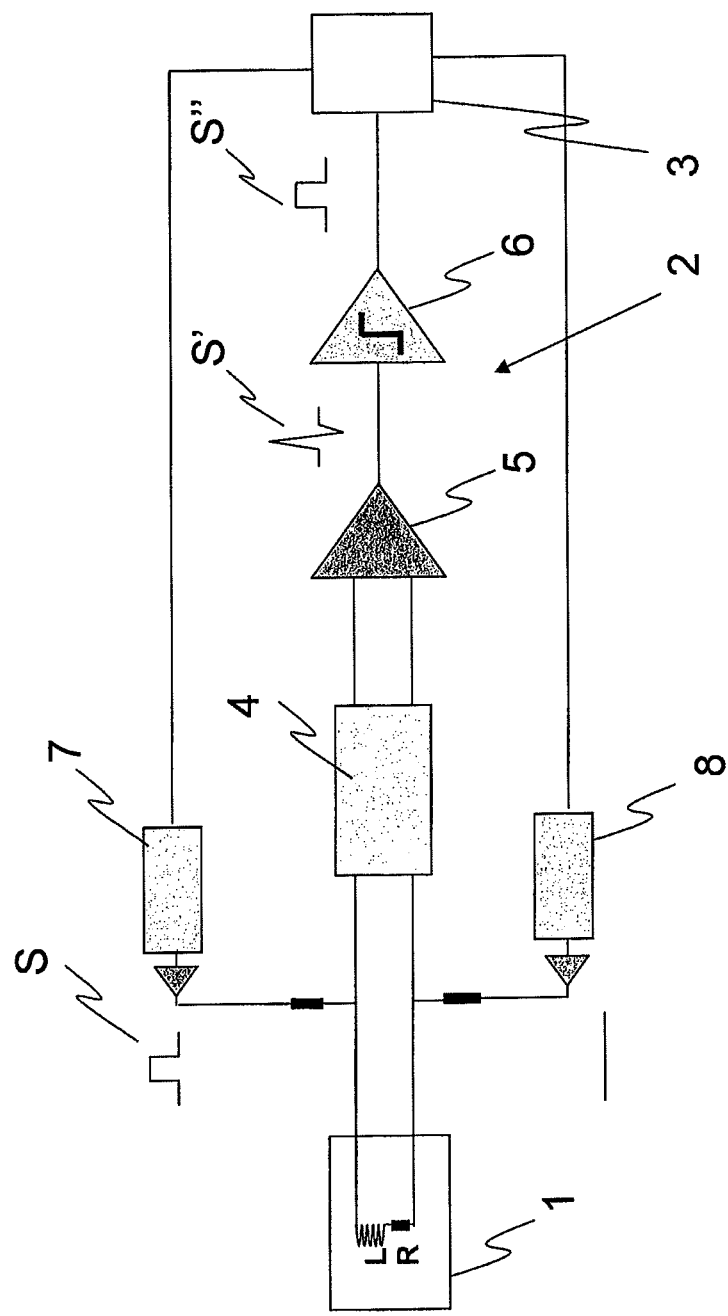
FIG. 4 is a view analogous to FIG. 1 showing a variant implementation of the method of the invention.

As shown in the variant of FIG. 4, the fault detection method in accordance with the invention may comprise performing the following steps when the rotary member with which the frequency sensor is associated is stationary:
    injecting a pulse S into the first terminal of the sensor 1, e.g. the hot point;
    detecting at least one pulse in the output signal S";
    injecting a pulse S into the second terminal of the sensor 1, at the cold point; and
    detecting a pulse in the output signal S".

In the absence of a short circuit to ground at the terminal into which the pulse is injected, the induction of the sensor ensures that it returns a strong pulse (the voltage across the terminals of the inductance depending on the derivative of the injected current), which pulse is to be found in the signal S' and thus in the signal S". The absence of this pulse is indicative of said terminal being short circuited to ground.

A flat signal may be injected into the terminal other than the terminal into which the pulse is injected.

It is possible in this variant to inject one or more pulses in order to obtain one or more squarewave pulses in the output signal S".

Although pulse injection and detection are performed successively for each of the terminals in this variant, it is also possible to test only one terminal.

What is claimed is:

1. A method of detecting a fault of a frequency sensor that is associated with a rotary member, the method comprising performing the following steps while the rotary member is stationary:
    injecting pulses into two terminals of the sensor in the form of inverted alternating signals (S1, S2) each comprising at least one first alternation (A1) and at least one second alternation (A2), the first alternation being of amplitude greater than the amplitude of the second alternation; and
    detecting at least one pulse in an output signal (S") from the sensor, detection relating to a frequency of the output signal (S") from the sensor.

2. The method according to claim 1, wherein the sensor has two terminals and pulse injection and detection are performed successively on each of the terminals.

3. The method according to claim 1, wherein the injected signals (S1, S2) are substantially sinusoidal.

4. A measurement circuit comprising a frequency sensor and an acquisition system including a digital computer arranged to implement the method according to claim 1.

5. The circuit according to claim 4, wherein the acquisition system comprises, from the sensor to the digital computer: a common-mode/differential-mode filter member; an amplifier; and a TTL shaper member.

* * * * *